S. R. WELDON.
Grain Drill.
No. 21,162.
Patented Aug. 10, 1858.
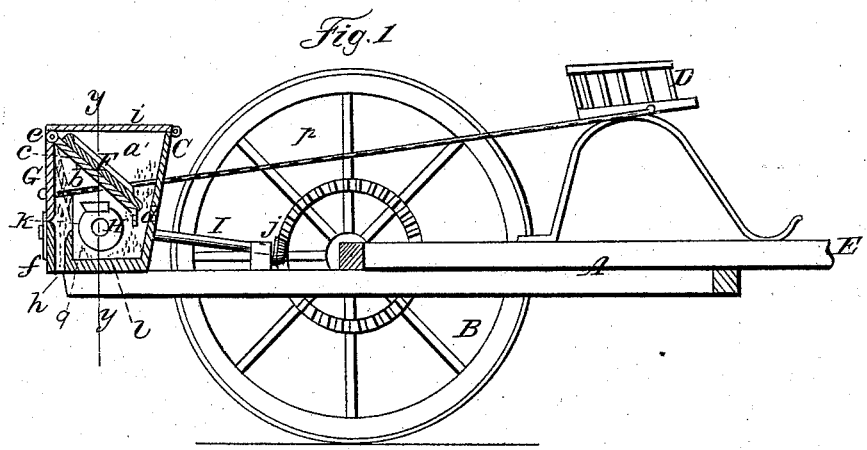
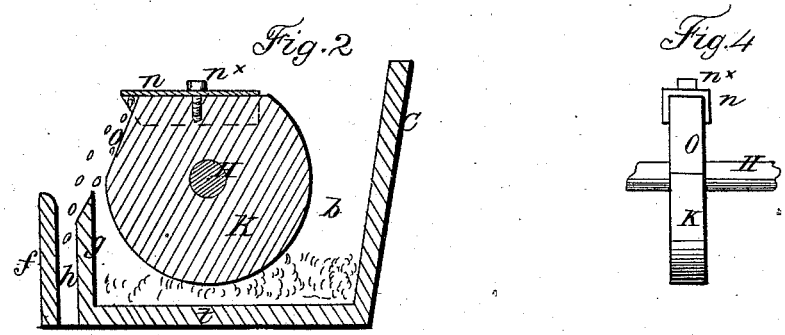
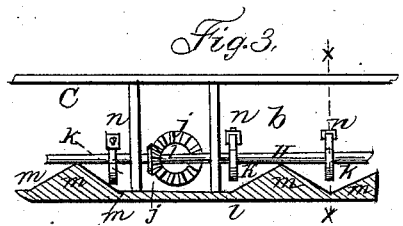

UNITED STATES PATENT OFFICE.

S. R. WELDON, OF WINNEBAGO STATION, ILLINOIS.

IMPROVEMENT IN SEEDING-MACHINES.

Specification forming part of Letters Patent No. 21,162, dated August 10, 1858.

*To all whom it may concern:*

Be it known that I, S. R. WELDON, of Winnebago Station, in the county of Winnebago and State of Illinois, have invented a new and Improved Seeding-Machine; and I do hereby declare that the following is a full, clear, and exact description of the same, reference being had to the annexed drawings, making a part of this specification, in which—

Figure 1 is a side sectional elevation of a seeding-machine constructed according to my invention. Fig. 2 is an enlarged transverse section of the seed-box, taken in the line $x\,x$, Fig. 3. Fig. 3 is a longitudinal section of a portion of the seed-box, taken in the line $y\,y$, Fig. 1. Fig. 4 is an edge view of one of the distributing-wheels.

Similar letters of reference indicate corresponding parts in the several figures.

This invention relates to an improvement in that class of seeding-machines which are designed for sowing seed broadcast.

The invention consists in the employment or use of a seed-box formed with two compartments, and arranged with a slide, adjustable flap, and discharge-orifice, as hereinafter shown and described, so as to insure the perfect distribution of the seed and to cut off the discharge when necessary.

To enable those skilled in the art to fully understand and construct my invention, I will proceed to describe it.

A represents a horizontal frame, which is mounted on wheels B B, and C is the seed-box, which is of the usual oblong form, and placed on the back part of the frame A just behind the wheels B B.

D is the driver's seat, which is placed on the front end of the frame A, and E is the draft-pole, attached directly to the front part of the frame A.

The seed-box C projects some distance beyond each side of the frame A, and it is divided into two compartments, $a\,b$, by a longitudinal partition, $c$, which extends the whole length of the seed-box, and is placed in an inclined position, the front edge of the partition being its lower end. The front edge of the partition does not touch the front side of the seed-box, a space, $d$, being allowed between.

F is a slide, which is placed on the partition $c$. By adjusting this slide the orifice $d$ may be contracted, as circumstances may require. The two compartments $a\,b$ are about of equal capacity, and a back board or flap, G, is hinged to the upper end of the compartment $b$, as shown at $e$, Fig. 1. The lower part of the back of the compartment $b$ has double walls or sides $f\,g$, a space, $h$, being allowed between, which space is the seed-discharging orifice.

The compartment $a$ of the seed-box C is provided with a hinged top, $i$, and in the compartment $b$ a longitudinal shaft, H, is placed. This shaft extends the whole length of the compartment $b$, and is rotated from one of the wheels B by means of a shaft, I, and gearing $j$. (See Figs. 1 and 3.)

On the shaft H a series of wheels, $k$, are placed at equal and suitable distances apart, the wheels extending the whole length of the shaft, and their lower edges being quite near the bottom $l$ of the compartment $b$. The bottom $l$ is formed of concaves or chambers $m$, with corresponding elevations, $m'$, as shown clearly in Fig. 3, a wheel, $k$, being directly over each chamber $m$.

On each wheel $k$ a seed-cup, $n$, is secured. These seed-cups may be constructed of sheet metal bent so as to have two parallel sides, and fitted over the edges of the wheels on cords or flat surfaces formed by removing therefrom.

By referring to Fig. 2 it will be seen that two segments are removed or taken from each wheel, and by adjusting the cups $n$, by means of set-screws $n^x$, by which they are attached to the wheels (see Figs. 2 and 4,) their outer ends may be made to project more or less over or beyond the ends of the adjoining flat surfaces $o$, and by this means the capacity of the seed-cups may be regulated as desired.

To the back board or flap, G, a cord, $p$, is attached. This cord is connected with the driver's seat D.

The operation is as follows: As the machine is drawn along, the shaft H and wheels $k$ are rotated from the driving-wheel by means of the gearing $j$ and shaft I. The seed to be sown is placed in the upper compartment, $a$, of the hopper, and the slide F adjusted so as to regulate the discharge of seed into $b$. The flap or back board, G, is kept closed by the cord $p$. As the wheels $k$ rotate the seed-cups $n$ elevate at each revolution of the wheels $k$ a certain amount of seed and discharge it against the flap G. This scatters the seed, and it falls through the space $h$ on the ground in a broadcast manner. The seed of course fills the chambers m. It naturally settles in them, and consequently passes within the reach of the cups n, and the aperture d is so graduated by the slide F that the compartment b may be supplied with seed about as fast as the seed is discharged from it, so as to retain the seed in the bottom b at about an equal height. The driver may at any time instantly stop the discharge of seed by placing his foot on the cord p, and thereby drawing inward the flap G, so that its lower end will cover the seed-discharge orifice h, as shown in red, Fig. 1.

By this invention the amount of seed to be sown on a given area may be graduated with great accuracy. The distributing device is sure in its operation, and the seed will be evenly sown.

Having thus described my invention, what I claim as new, and desire to secure by Letters Patent, is—

Dividing the hopper C into two equal compartments, a b, and using a slide, F, to graduate the opening d between them, when the hopper thus arranged is used in combination with the rotating seed-distributing wheels k, flap or back board, G, and the double walls f g, all arranged to operate as and for the purpose set forth.

S. R. WELDON.

Witnesses:
 M. L. GORHAM,
 W. R. GEARHART.